Sept. 17, 1940.  L. G. CRESSMAN  2,215,117
ENGINE SUPPORT
Filed June 15, 1939   2 Sheets-Sheet 1
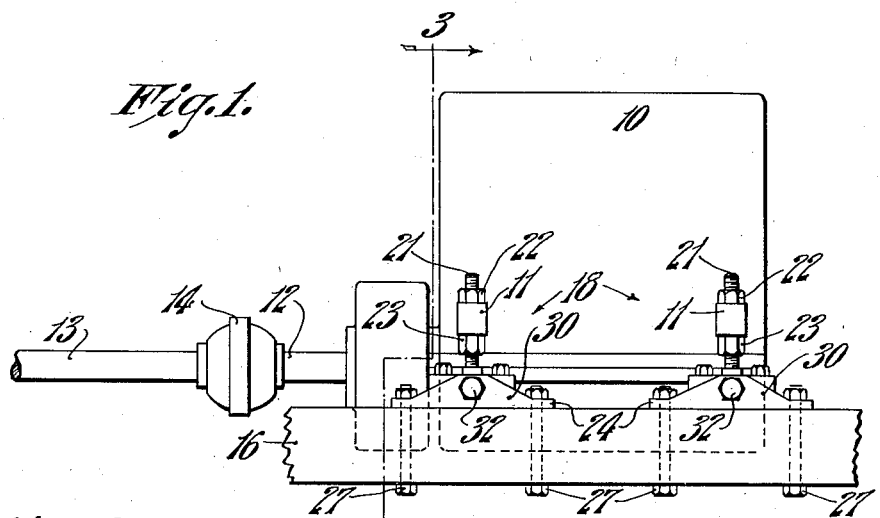
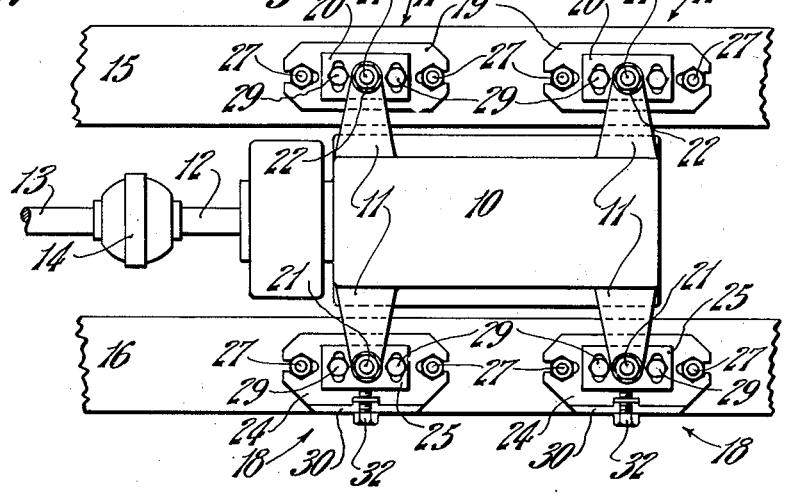
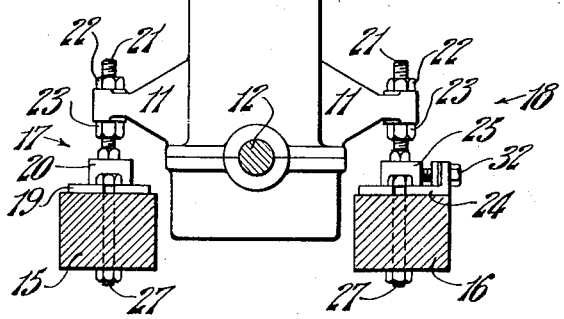
INVENTOR,
Lucius G. Cressman,
BY
Blake A Leaver
ATTORNEY.

Sept. 17, 1940.   L. G. CRESSMAN   2,215,117
ENGINE SUPPORT
Filed June 15, 1939   2 Sheets-Sheet 2
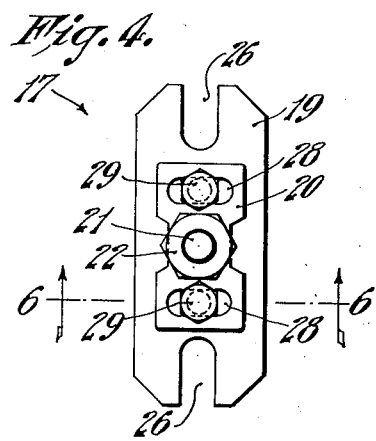
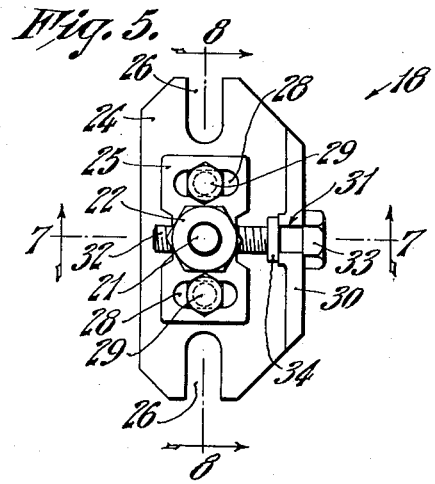
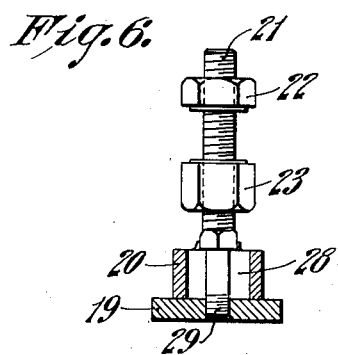
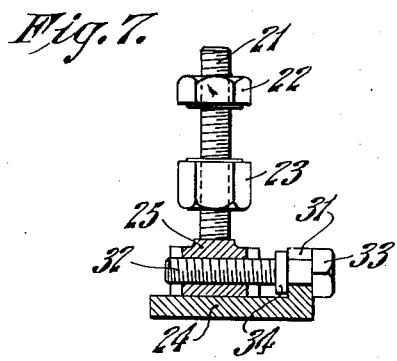
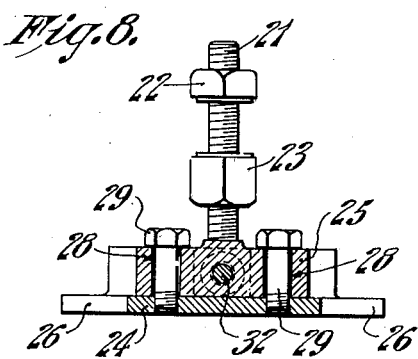
INVENTOR,
Lucius G. Cressman,
BY
ATTORNEY.

Patented Sept. 17, 1940

2,215,117

UNITED STATES PATENT OFFICE 2,215,117

ENGINE SUPPORT

Lucius G. Cressman, Springfield, Mass.

Application June 15, 1939, Serial No. 279,263

4 Claims. (Cl. 248—23)

This invention relates to improvements in engine supports, and is particularly directed to a system of engine supports for marine or vehicle engines.

An object of this invention is to provide means for adjustably mounting or supporting an engine in such a manner that the axis of the crank shaft of the engine may be adjusted longitudinally, transversely, and vertically.

Another object of this invention is to provide a plurality of cooperating supports for an engine, so designed and constructed that any one of the supports may serve as a pivot during adjustment of the position of the engine.

A further object of this invention is to provide supporting devices capable of accomplishing the above objects, which at the same time will be of simple, sturdy design, and economical of manufacture.

These, and other objects and advantages of this invention, will be more completely described and disclosed in the following specification, the accompanying drawings, and the appended claims.

Broadly, this invention comprises a pair of engine supports including opposed base members, each provided with aligned slots for adjustably receiving securing bolts, a block member slidably supported on each of the base members for transverse movement relative to the aligned slots in the base members, one of said base members being provided with an axially stationary screw threadably engaged in the block on that base member, a substantially vertical threaded stud on each of the block members, a pair of nuts on each of the studs for adjustably engaging a supporting lug on an engine block.

A preferred embodiment of this invention is illustrated in the accompanying drawings in which:

Fig. 1 is a side view of an engine and frame, with the engine mounted on the adjustable supports.

Fig. 2 is a plan view of the construction shown in Fig. 1,

Fig. 3 is a sectional view taken on the line 3—3 of Fig. 1,

Fig. 4 is a plan view of one of the supporting members,

Fig. 5 is a plan view of the mate to the member shown in Fig. 4,

Fig. 6 is a cross sectional view taken on the line 6—6 of Fig. 4,

Fig. 7 is a cross sectional view taken on the line 7—7 of Fig. 5, and

Fig. 8 is a longitudinal sectional view taken on the line 8—8 of Fig. 5.

Referring now to the drawings in detail, in which like numerals refer to like parts throughout, An engine 10, provided with bored lugs 11 and having a crank shaft 12 connected to a drive shaft 13 by means of a coupling 14, is adjustably mounted on frame members 15 and 16 by means of engine supports 17 and 18. The engine 10 is adjustably mounted for longitudinal, transverse, and vertical adjustment, in order to properly align the axis of the crank shaft 12 with the drive shaft 13.

The engine supports 17 and 18 are used in pairs, as indicated in Fig. 2. Each of the supports 17 includes a base plate 19, block 20, vertical threaded stud 21, and nuts 22 and 23 on the studs 21.

Each of the supports 18 includes a base plate 24, block 25, vertical threaded stud 21, and nuts 22 and 23.

The base plates 19 and 24 are provided with longitudinally aligned slots 26 for receiving bolts or screws 27, the bolts 27 serving to secure the base plates 19 and 24 to the frame members 15 and 16. The block members 20 and 25 are formed with transverse slots 28 for receiving screws 29 which are threaded into the base plates 19 and 24, as best shown in Figs. 6 and 8. As shown in the drawings, the studs 21 are integral with the blocks 20 and 25, but they may be separate, if desired, and secured in the blocks by any suitable means, such as threads, pins, or setscrews.

The base plates 24 are provided with side flanges 30 formed with slots 31, in which slots 31 screws 32 are secured against axial or longitudinal movement by cooperation of screw heads 33 and collar portions 34. The screws 32 are threadably engaged in the blocks 25, as best indicated in Fig. 7.

In operation, the nuts 22 are removed from the studs 21, the engine supports 17 and 18 placed on the frames 15 and 16 with the bolts 27 engaged in the slots 26 of the plates 19 and 24, the engine 10 set on the supports 17 and 18 with the studs 21 projecting through the bored lugs 11, and the nuts 22 replaced on the studs 21. Thus assembled, the alignment of the engine shaft 12 may be adjusted longitudinally, transversely, and vertically, by manipulation of the various elements connected with the supports 17 and 18.

Longitudinal adjustment is accomplished by loosening the bolts or screws 27 and sliding the base plates 19 and 24 on the frames 15 and 16. Transverse adjustment is obtained by loosening the screws 29 and manipulating the screws 32, thus pulling or pushing the blocks 25 on the base plates 24. As the blocks 25 are moved, their complementary blocks 20 on plates 19 will be correspondingly moved, through the connecting studs 21, engine lugs 11, and engine 10. It should be noted that, by means of this arrangement of parts, transverse adjustment is provided with only two screws, located on one side of the engine 10, thus providing a very simple and efficient adjustment. Vertical adjustment is easily accomplished by manipulation of the nuts 22 and 23 on the studs 21.

The slots 26 in the bases 19 and 24, and the slots 28 in the blocks 20 and 25, are slightly wider than the diameters of the bolts or screws received therein. This construction permits a sufficient amount of pivotal action for all practical adjustments. Thus, any one of the studs 21 may serve as a pivot in adjusting the relative positions of the other three. The studs 21 are also formed with a diameter slightly less than the diameter of the bores in the lugs 11, thus permitting pivotal movement on any of the studs 21 for vertical adjustment.

From the above description of the construction and operation of this invention, it will be clearly understood by those skilled in such arts, that I have invented a new and useful device or devices, by means of which the crank shaft of an engine may be universally adjusted.

What I claim is:

1. An engine support comprising, in combination, a base plate provided with aligned longitudinal slots, a block slidably supported on said base plate and provided with transverse slots, means engaged in said base plate and the slots in said block for clamping said block on said base plate, an upwardly projecting stud on said block, an engine supporting member adjustably supported on said stud, and a locking member removably and adjustably supported on said stud above said engine supporting member.

2. An adjustable engine support comprising a base plate provided with longitudinal slots, a block slidably supported on said base plate, means cooperating with said block and said base plate for adjustably positioning said block on said base plate transversely relative to said longitudinal slots, said means including screws threaded into said base plate and engaged in transverse slots formed in said block, vertically adjustable means on said block for engaging a supporting lug on an engine.

3. An engine support including a base member provided with longitudinal slots for adjustably receiving securing bolts or screws, a block member slidably supported on said base member for transverse movement relative to said longitudinal slots, means for clamping said block on said base member, an axially stationary screw rotatably secured on said base member and threadably engaged in said block for transversally adjusting said block on said base plate, vertically adjustable means on said block for engaging a supporting lug on an engine.

4. An engine support including a base member provided with longitudinal aligned slots for adjustably receiving securing bolts or screws, a block member slidably supported on said base member for transverse movement relative to said longitudinal slots, said block member being provided with transverse slots, clamping screws secured in said base member and engaged in said transverse slots, an axially stationary screw rotatably supported on said base member and threadably engaged in said block for transversally adjusting said block on said base member, an upwardly projecting, threaded stud on said block, nuts on said stud for vertically adjusting an engine supporting lug engaged on said stud.

LUCIUS G. CRESSMAN.